United States Patent
Hsu et al.

(10) Patent No.: US 7,549,213 B2
(45) Date of Patent: Jun. 23, 2009

(54) METHOD FOR INDEPENDENT TRACKWIDTH AND WALL ANGLE CONTROL AND HEXAGONAL WRITE HEAD

(75) Inventors: Yimin Hsu, Sunnyvale, CA (US); Jyh-Shuey Lo, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 407 days.

(21) Appl. No.: 11/035,090

(22) Filed: Jan. 12, 2005

(65) Prior Publication Data

US 2006/0152850 A1    Jul. 13, 2006

(51) Int. Cl.
G11B 5/187    (2006.01)
(52) U.S. Cl. ............. 29/603.12; 29/603.13; 29/603.15; 29/603.16; 29/603.18; 360/125.02; 360/125.1; 360/125.2; 360/125.52; 360/125.65
(58) Field of Classification Search ............. 29/603.12, 29/603.13, 603.14, 603.15, 603.16, 603.18; 360/122, 125, 126, 125.51, 125.52, 125.64, 360/125.65, 317, 318, 125.02, 125.09, 125.1, 360/125.19, 125.2; 216/22
See application file for complete search history.

(56) References Cited

U.S. PATENT DOCUMENTS

| | | | |
|---|---|---|---|
| 5,867,890 A | 2/1999 | Hsiao et al. | 29/603.14 |
| 5,916,423 A | 6/1999 | Westwood | 204/192.32 |
| 5,949,625 A | 9/1999 | Sato et al. | 360/122 |
| 5,959,813 A | 9/1999 | Watanabe et al. | 360/126 |
| 6,083,410 A | 7/2000 | Ikegawa et al. | 216/22 |
| 6,119,331 A * | 9/2000 | Chang et al. | 29/603.14 |
| 6,178,065 B1 * | 1/2001 | Terunuma et al. | 360/125.51 |
| 6,252,748 B1 | 6/2001 | Yamanaka et al. | 360/317 |
| 6,261,468 B1 | 7/2001 | Sato et al. | 216/22 |
| 6,330,743 B1 | 12/2001 | Iijima et al. | 29/603.14 |
| 6,469,875 B1 * | 10/2002 | Chen et al. | 360/317 |
| 6,487,041 B2 | 11/2002 | Yamanaka et al. | 360/126 |
| 6,596,609 B2 | 7/2003 | Cheng et al. | 438/450 |
| 6,631,054 B2 | 10/2003 | Miyazaki et al. | 360/317 |
| 6,633,453 B1 | 10/2003 | Parker | 360/126 |
| 6,722,019 B1 | 4/2004 | Krounbi et al. | 29/603.14 |
| 2003/0112555 A1 | 6/2003 | Sato et al. | 360/126 |

FOREIGN PATENT DOCUMENTS

JP    2007-149223    *    6/2007

* cited by examiner

*Primary Examiner*—A. Dexter Tugbang
(74) *Attorney, Agent, or Firm*—Patent Law Office of Larry Guernsey; Larry B. Guernsey (57) ABSTRACT

A method for independently controlling track width and bevel angle of a write pole tip having a P3 pole tip for perpendicular recording. The method includes establishing the track width in a portion of the P3 layer material. A portion of this portion having the established track width is protected by providing a temporary masking material to make a protected portion. At least one unprotected portion is left exposed to be shaped. This unprotected portion is then beveled to produce at least one beveled portion having a bevel angle. The protected portion produces a rectangular portion which together with the beveled portion produce a hexagonal pole tip. Also a magnetic head having a hexagonal pole tip, and a disk drive having a magnetic head having a hexagonal pole tip.

4 Claims, 8 Drawing Sheets

METHOD FOR INDEPENDENT TRACKWIDTH AND WALL ANGLE CONTROL AND HEXAGONAL WRITE HEAD

BACKGROUND OF THE INVENTION

1. Field of the Invention

The present invention relates generally to manufacture of heads for data storage devices and more specifically to a perpendicular write head for a hard disk drive.

2. Description of the Prior Art

Data has been conventionally stored in a thin media layer adjacent to the surface of a hard drive disk in a longitudinal mode, i.e., with the magnetic field of bits of stored information oriented generally along the direction of a circular data track, either in the same or opposite direction as that with which the disk moves relative to the transducer.

More recently, perpendicular magnetic recording systems have been developed for use in computer hard disk drives. A typical perpendicular recording head includes a trailing write pole, a leading return or opposing pole magnetically coupled to the write pole, and an electrically conductive magnetizing coil around the write pole. In this type of disk drive, the magnetic field of bits of stored information are oriented normal to the plane of the thin film of media, and thus perpendicular to the direction of a circular data track, hence the name.

Media used for perpendicular recording typically include a hard magnetic recording layer and a soft magnetic underlayer which provides a flux path from the trailing write pole to the leading opposing pole of the writer. Current is passed through the coil to create magnetic flux within the write pole. The magnetic flux passes from the write pole tip, through the hard magnetic recording track, into the soft underlayer, and across to the opposing pole, completing a loop of flux.

Perpendicular recording designs have the potential to support much higher linear densities than conventional longitudinal designs. Magnetization transitions on the bilayer recording disk are recorded by a trailing edge of the trailing pole and reproduce the shape of the trailing pole projection on the media plane, thus the size and shape of the pole tip is of crucial importance in determining the density of data that can be stored.

Figure 5:
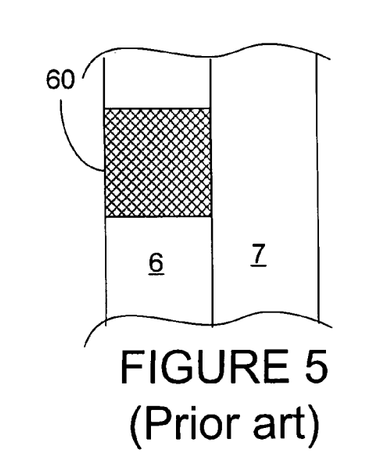
FIGS. 5-6 are a top plan views of an un-beveled P3 pole tip of a write head of the prior art and its interaction with two adjacent data tracks.
Figure 6:
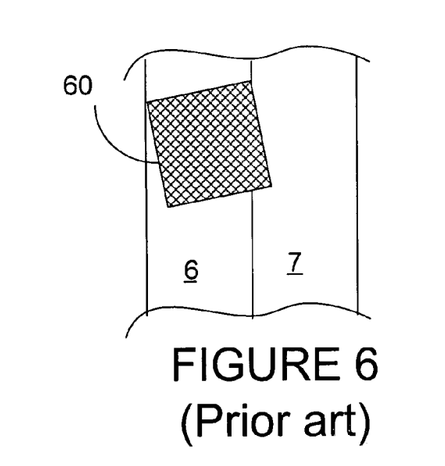
Figure 7:
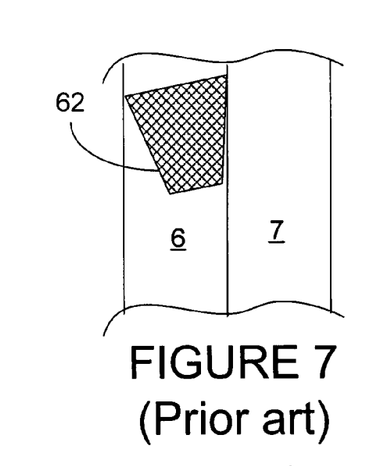
FIG. 7 is a top plan views of a beveled P3 pole tip of a write head of the prior art and its interaction with two adjacent data tracks.

Perpendicular magnetic recording is expected to supersede longitudinal magnetic recording due to the ultra-high density magnetic recording that it enables. Increases in areal density have correspondingly required devising fabrication methods to substantially reduce the width of the P3 write pole tip while maintaining track-width control (TWC) and preserving trailing edge structural definition (TED). As mentioned above, the writing process reproduces the shape of the P3 write pole projection on the media plane, so the size of the P3 pole tip limits the size of the data fields and thus the areal density. The current drive is to make P3 pole tips of widths less than 200 nm ($200 \times 10^{-9}$ meters). Making reliable components of such microscopic size has been a challenge to the fabricating process arts. This problem is made even more challenging because the P3 pole tip shape at the ABS is preferably not a simple rectangle, but is trapezoidal, with parallel top and bottom edges, but a bevel angle preferably of approximately 6 to 15 degrees on the side edges. This is primarily done so that the P3 pole tip fits into the curved concentric tracks without the corners extending into an adjacent track by mistake. This is illustrated in FIGS. 5-7 (prior art). The width of the data track corresponds to the width of the P3 pole tip. In FIG. 5 (prior art) an un-beveled P3 pole tip 60 is shown on a first data track 6, with a second data track 7 adjacent to the first. The data tracks are actually curved, but at this scale, the curvature is so slight that it is represented as straight. It is not uncommon for the P3 pole tip 60 to become angled slightly as it follows the data track 6. FIG. 6 (prior art) shows the un-beveled P3 pole tip 60 which has been slightly tilted. It can be seen that although the upper corners of the un-beveled P3 pole tip 60 remain in the first track 6, the lower corner now intrudes into the adjacent track 7, which may contains previously written data, and which may now be distorted or partially written over by the intruding corner. As this tilting is common, it has become practice in the industry to bevel the P3 pole tip so that a trapezoidal shape is achieved, as shown in FIG. 7 (prior art). This produces what will be referred to as a beveled P3 pole tip 62. It can now be seen that the entire beveled P3 pole tip 62 is within the data track 6, despite the angle variation of the P3 pole tip 62 as a whole.

Figure 8:
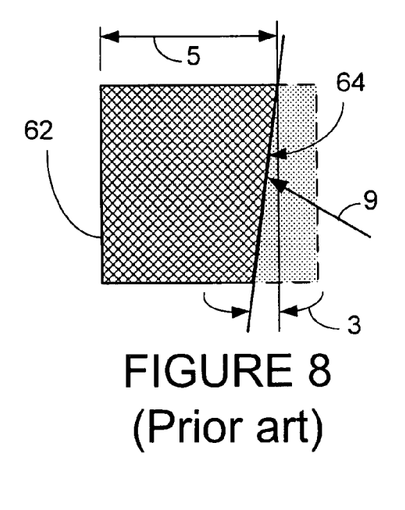
FIGS. 8-9 are top plan views of a beveled P3 pole tip of a write head of the prior art as its walls are beveled and track width reduced.
Figure 9:
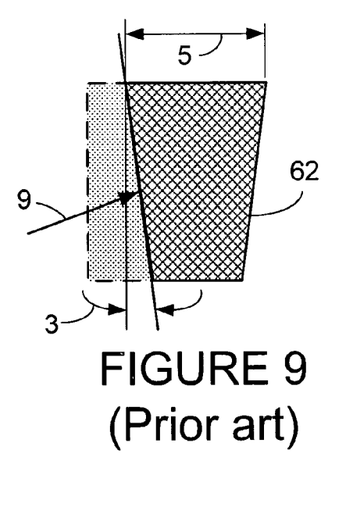

In fabrication of the beveled P3 pole tip, it is usual practice in the prior art to use an ion milling beam which is angled as shown by the ion milling direction arrow 9 in FIG. 8 (prior art) to shape the P3 pole tip 62, producing the bevel angle 3. However, it is difficult to control both the angle and the lateral positioning of the ion milling beam. As a result, the P3 pole tip 62 is not only beveled, but the milling process results in a reduction of the overall width of the P3 pole tip 62, as shown by the area in dashed lines that is lost in the process of producing the right hand bevel. The track width 5 is determined by the overall width of the P3 pole tip, as indicated by the arrow 5. This has the unintended effect of varying the track width 5 at the same time that the bevel angle 3 is produced. The problem is compounded when the left-hand side of the P3 pole tip 62 is also beveled, as shown in FIG. 9 (prior art), so that another area is lost and the overall width and thus the track width 5 is further reduced. To put this another way, in the processes of the prior art, the track width 5 and bevel angle 3 are not independently controlled. The eventual track width 5 depends on the control of the beam during the angular ion milling process, and there have traditionally been problems in maintaining satisfactory control over both of these variables simultaneously. This uncertainty of control results in poor yields as the track width dimension may easily be reduced too much below acceptable limits and thus the entire P3 pole tip structure must be discarded.

Thus there is a need for a method of production in which the bevel angle and track width produced are control as independent variables. There also is a need for a P3 pole tip that has at least one portion in which the width has been established independently of the bevel angle of the other portions of the P3 pole tip.

SUMMARY OF THE INVENTION

The present invention is a method for independently controlling track width and bevel angle of a write pole having a P3 pole tip for perpendicular recording. The method includes establishing the track width in a portion of the P3 layer material. A portion of this portion having the established track width is protected by providing a temporary masking material to make a protected portion. At least one unprotected portion is left exposed to be shaped. This unprotected portion is then beveled to produce at least one beveled portion having a bevel angle. The protected portion produces a rectangular portion which together with the beveled portion produce a hexagonal pole tip.

Also disclosed is a magnetic head having a hexagonal pole tip, and a disk drive having a magnetic head having a hexagonal pole tip.

It is an advantage of the perpendicular magnetic head of the present invention that the write head pole tip has beveled portions so that there is less interference with adjacent tracks.

It is another advantage of the perpendicular magnetic head of the present invention that track width can be controlled independently from the bevel angle of the wall sides of the write head pole tip.

It is a further advantage of the perpendicular magnetic head of the present invention that fabrication is easier, since it is not necessary to attempt to control bevel angle and track width at the same time.

It is yet another advantage of the perpendicular magnetic head of the present invention that production yields are expected to be higher, since bevel angle and track width are controlled independently.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
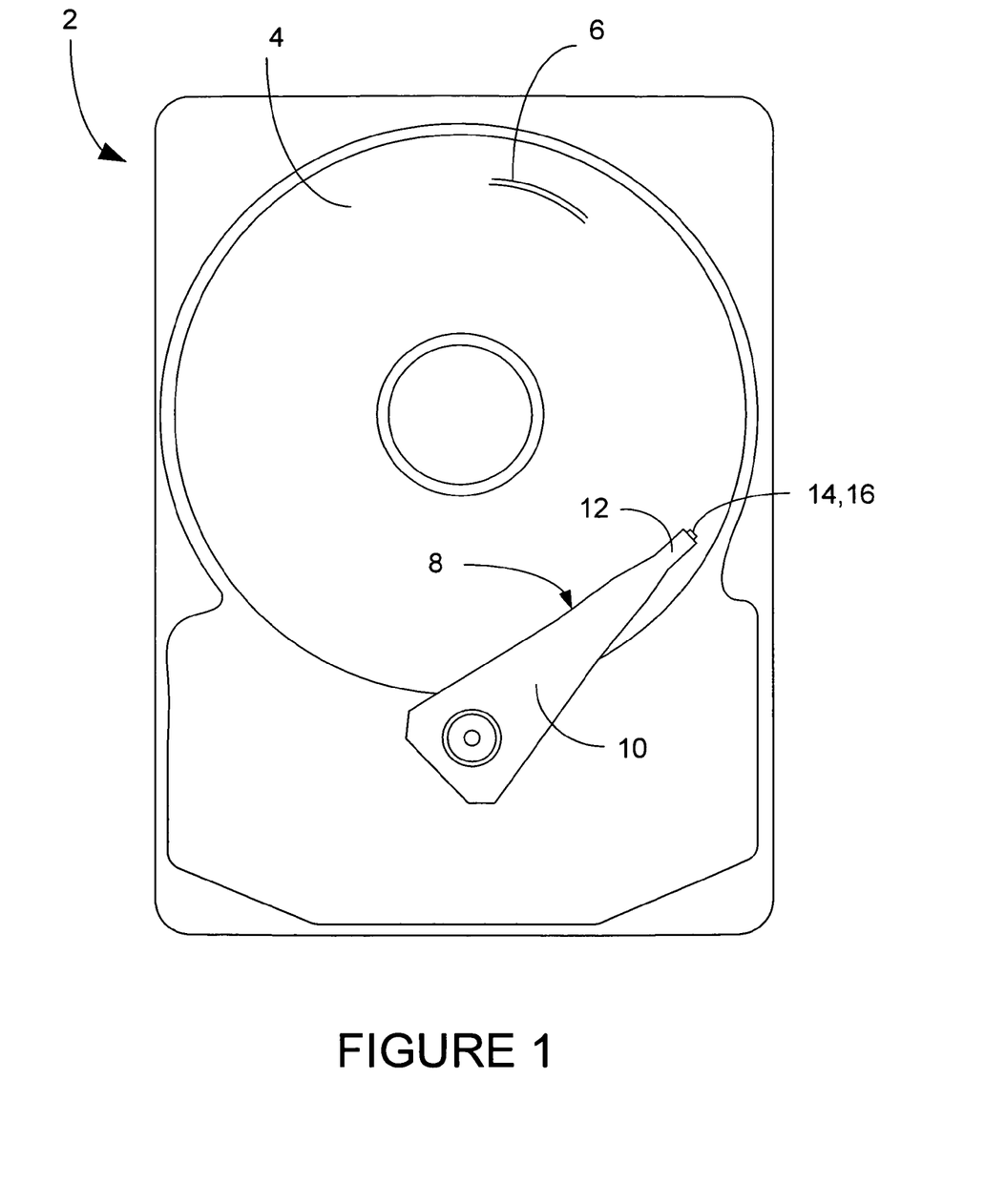
FIG. 1 shows a top plan view of an exemplary disk drive.

An exemplary magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
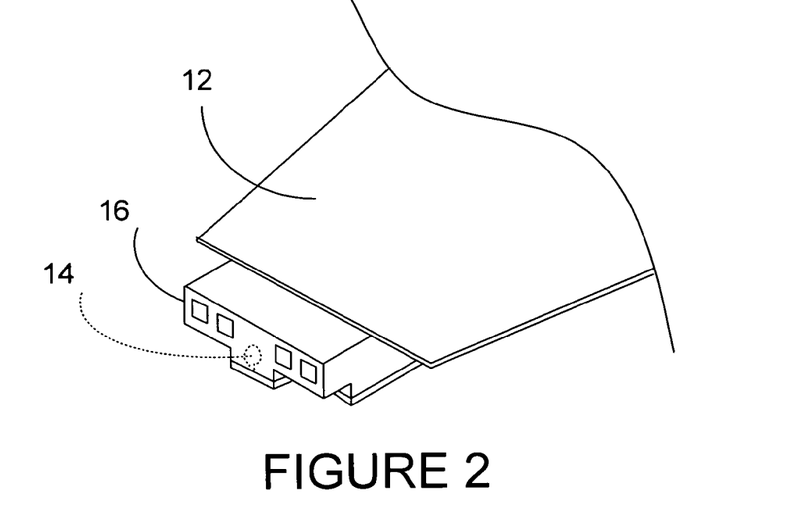
FIG. 2 illustrates a perspective view of view of an exemplary slider and suspension.
Figure 3:
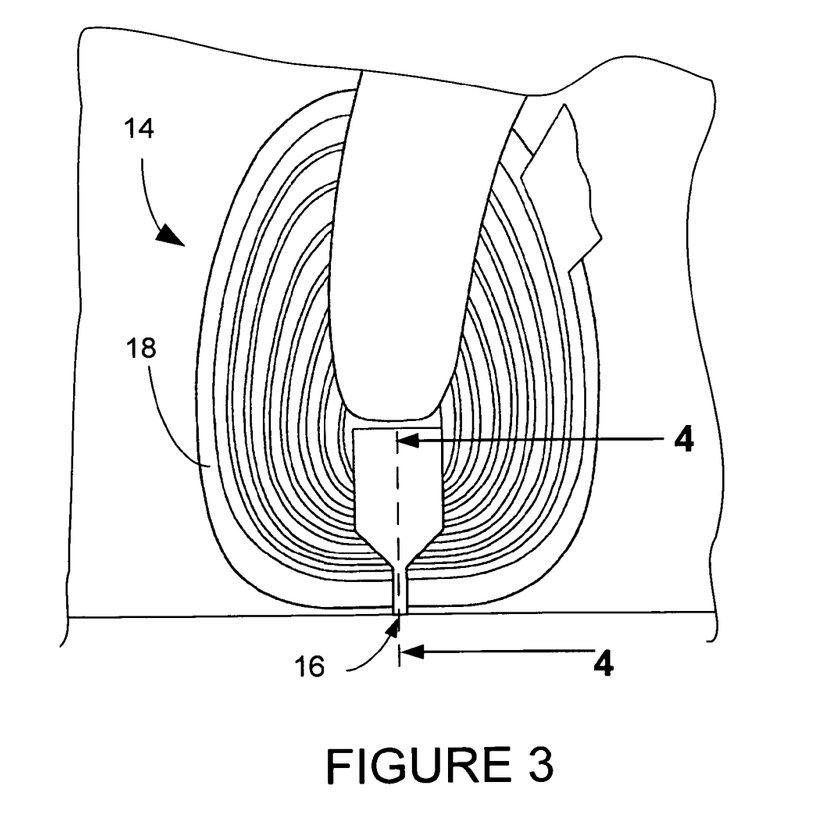
FIG. 3 shows a top plan view of an exemplary read/write head.

FIG. 2 shows a slider 16 in more detail being supported by suspension 12. The magnetic head 14 is shown in dashed lines, and in more detail in FIGS. 3 and 4. The magnetic head 14 includes a coil 18.

The slider which will be discussed below is of a configuration known as perpendicular head. In this type of disk drive, the magnetic field of bits of stored information are oriented normally to the plane of the thin film of media, and thus perpendicular to the direction of a circular data track, hence the name. A typical perpendicular recording head includes a trailing write pole, a leading return or opposing pole magnetically coupled to the write pole, and an electrically conductive magnetizing coil surrounding the write pole.

Figure 4:
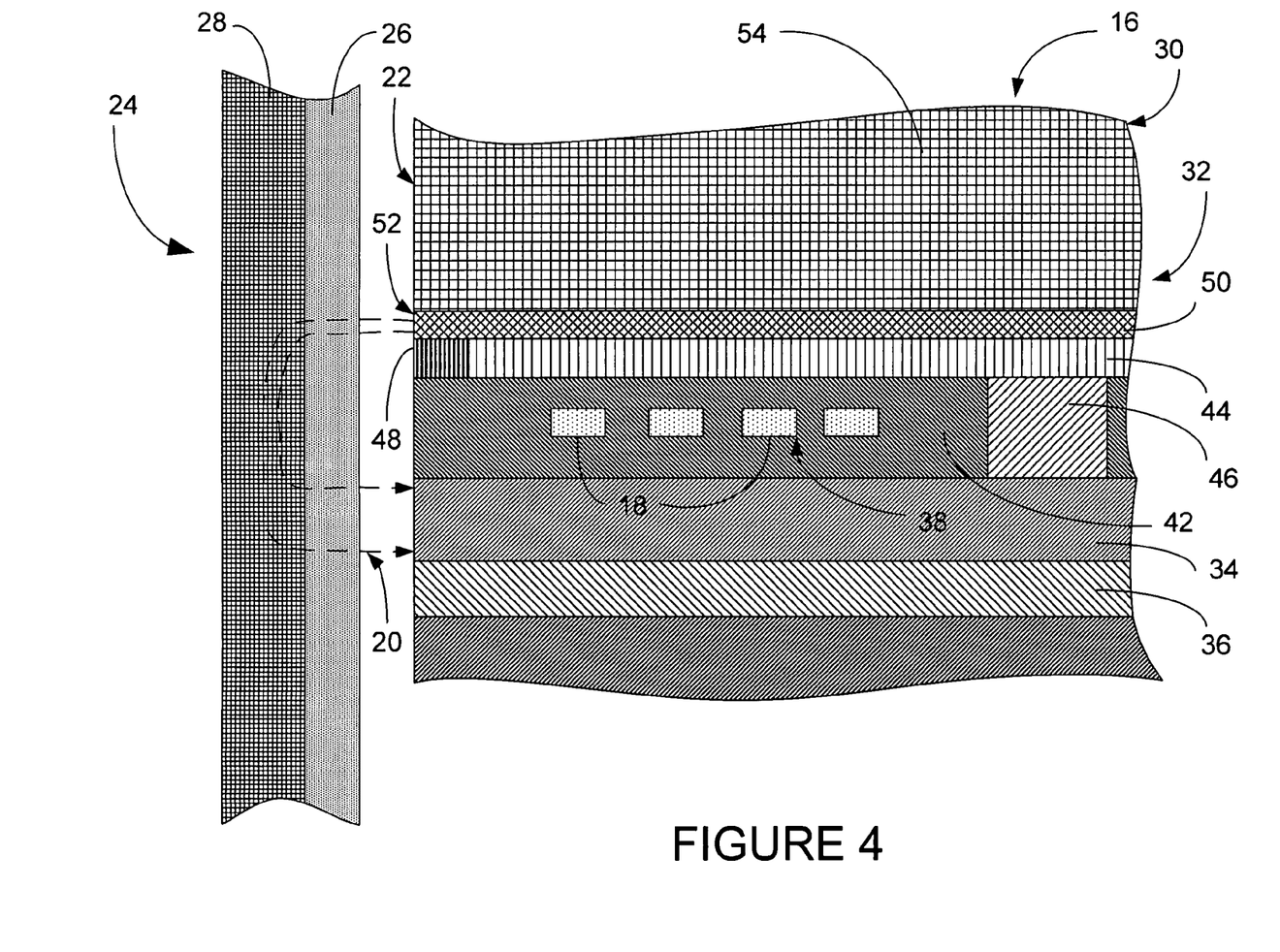
FIG. 4 is a cross-section view of an exemplary perpendicular write head.

FIG. 4 is a side cross-sectional diagram of the write head portion of a representative perpendicular magnetic head 30. The slider 16 has an air bearing surface (ABS) 22 which flies above the surface of a hard disk 24. The disk 24 includes a high coercivity magnetic layer, also referred to the hard layer 26 that is fabricated on top of a magnetically soft layer 28.

The perpendicular head 30 typically includes a read head, which is not shown here. The write head portion includes a first magnetic pole P1 34 which is fabricated upon an insulation layer 36. An induction coil structure 38, which includes coils 18, is fabricated upon the P1 pole 34. The coil turns 18 are typically formed within electrical insulation layers 42. A second magnetic pole layer, typically termed a P2 shaping layer 44, is fabricated on top of the induction coil structure 38. A magnetic back gap piece 46 joins the back portions of the P1 pole 34 and the P2 shaping layer 44, such that magnetic flux can flow between them. The P2 shaping layer 44 is fabricated so that a gap 48 is left between it and the rest of the ABS 22, and an alumina fill is deposited across the surface of the wafer which results in filling the gap 48 in front of the P2 shaping layer 44. A P3 layer 50, also called a probe layer, includes a P3 pole tip 52, and is in magnetic flux communication with the P2 shaping layer 44. The P2 shaping layer 44 channels and directs the magnetic flux into the P3 pole tip 52.

The magnetic head 30 is subsequently encapsulated, such as with the deposition of an alumina layer 54. Thereafter, the wafer is sliced into rows of magnetic heads, and the ABS surface of the heads is carefully polished and lapped and the discrete magnetic heads are formed.

Electrical current flowing through the induction coil structure 38 will cause magnetic flux 20 to flow through the magnetic poles 34, 52 of the head, where the direction of magnetic flux flow depends upon the direction of the electrical current through the induction coil. In one direction, current will cause magnetic flux 20 to flow through the P2 shaping layer 44 through the P3 layer 50 to the narrow pole tip 54 into the hard layer 26 and soft layer 28 of the hard disk 24. This magnetic flux 20 causes magnetized data bits to be recorded in the high coercivity layer hard layer 26 where the magnetic field of the data bits is perpendicular to the surface of the disk 24. The magnetic flux then flows into the magnetically soft underlayer 28 and disperses as it loops back towards the P1 pole 34. The magnetic flux then flows through the back gap piece 46 to the P2 shaping layer 44, thus completing a magnetic flux circuit. In such perpendicular write heads, it is significant that at the ABS 22, the P1 pole 34 is much larger than the P3 pole tip 52 so that the density of the magnetic flux passing out from the high coercivity magnetic hard layer 26 is greatly reduced as it returns to the P1 pole layer 34 and will not magnetically affect, or flip, the magnetic field of data bits on the hard disk, such as bits on data tracks adjacent to the track being written upon.

To aid in the understanding of the novelty of the present invention, a comparison with the fabrication processes of the prior art, as discussed above with reference to FIGS. 8-9, may be useful. In fabrication of the beveled P3 pole tip 62, in beveling of the sides, referred to as walls 64, it is usual practice in the prior art to use an ion milling beam which is angled as shown by the ion milling direction arrow 9 in FIG. 8 (prior art). This shapes the P3 pole tip 62, producing the bevel angle 3. However, it is difficult to control both the angle and the lateral positioning of the ion milling beam. As a result, walls 64 of the P3 pole tip 62 are not only beveled, but the milling process results in a reduction of the overall width of the P3 pole tip 62, as shown by the area in dashed lines that is lost in the process of producing the right hand bevel. The track width 5 is determined by the overall width of the P3 pole tip 62, as indicated by the arrow 5. This has the unintended effect of varying the track width 5 at the same time that the bevel angle 3 is produced. The problem is compounded when the left-hand side of the P3 pole tip 62 is also beveled, as shown in FIG. 9 (prior art), so that another area is lost and the overall width and thus the track width 5 is further reduced.

To put this another way, in the processes of the prior art, the track width 5 and bevel angle 3 are not independently controlled. The eventual track width 5 depends on the control of the beam during the angular ion milling process, and there have traditionally been problems in maintaining satisfactory control over both of these variables simultaneously. This uncertainty of control results in poor yields as the track width dimension may easily be reduced too much below acceptable limits and thus the entire P3 pole tip structure must be discarded.

Figure 10:
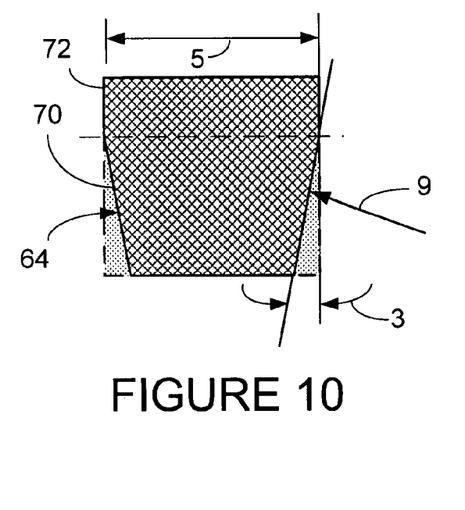
FIG. 10 is a top plan view of a hexagonal P3 pole tip of a write head of the present invention as its walls are beveled but its track width remains intact.
Figure 19:
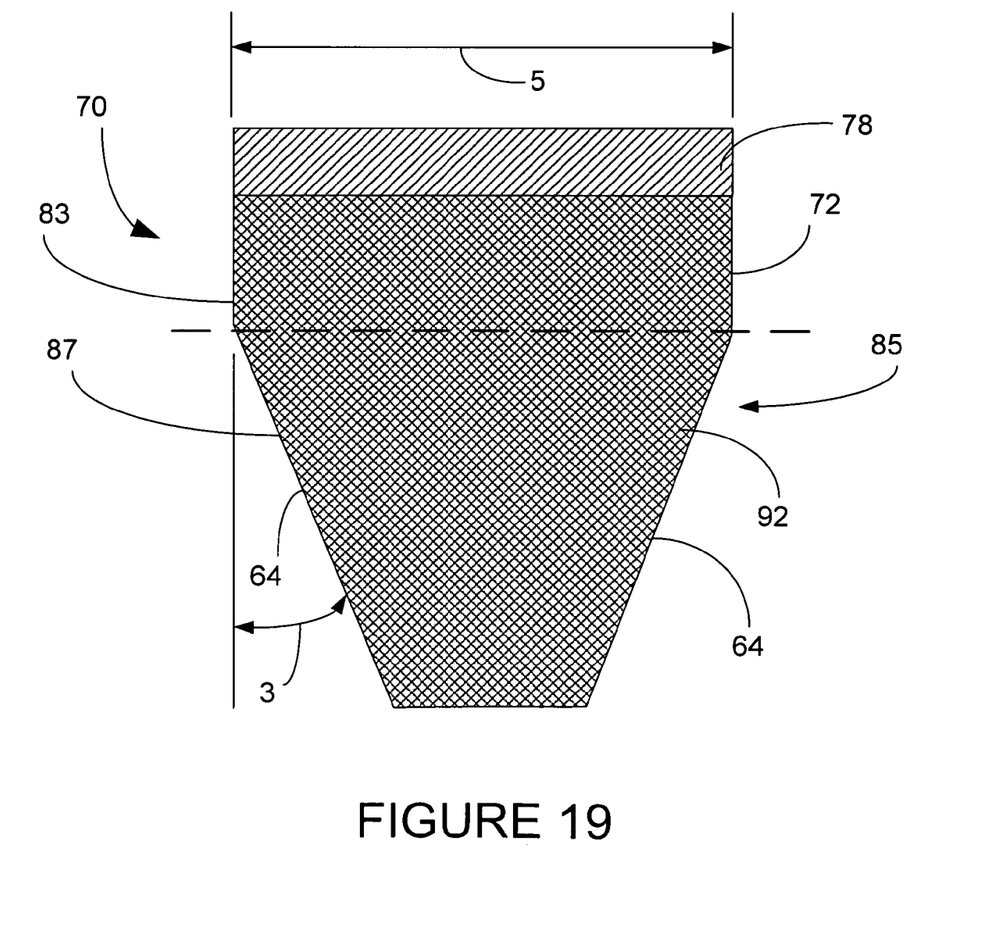
FIG. 19 is a detail top plan view of the hexagonal P3 pole tip of the present invention.

In contrast, the P3 pole tip of the write head of the present invention is shown in FIG. 10 and in more detail in FIG. 19. This present P3 pole tip has a distinctive and novel shape and configuration compared to those of the prior art, and having 6 sides rather than the usual 4 of the trapezoidal prior art, will be referred to for purposes of this discussion as a hexagonal P3 pole tip 70. Although the method for fabricating the hexagonal P3 pole tip 70 will be described in greater detail below, generally, this hexagonal P3 pole tip 70 has a track width 5 which is established with great precision by an ion milling process taken at normal incidence to the walls of the P3 material. A later step involves application of an ion milling source at a beveled angle 3, but there is a portion of the P3 which is masked or shielded by a temporary mask structure. This portion that is shielded will be referred to as the rectangular portion 72, and this portion retains the full track width produced by the initial ion milling at normal incidence. Thus the track width 5 and bevel angle 3 are independently controlled, and allow finer control and thus greater production yields than those produced by prior art methods. As referred to above, the hexagonal P3 pole tip 70 of the present invention has a different shape and configuration than the trapezoidal P3 pole tips of the prior art and is assertedly novel in itself over the prior art.

Figure 11:
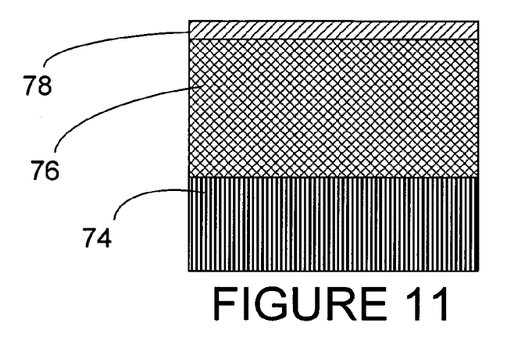
FIGS. 11-18 are views of various stages in the fabrication of the hexagonal P3 pole tip of the present invention.

FIGS. 11-18 show various stages of the fabrication of the hexagonal P3 pole tip 70 structure as seen from the ABS, and the following discussion refers to all of these drawings generally. In FIG. 11, the alumina $Al_2O_3$ insulation layer 74 in front of the shaping layer 44 (see FIG. 4) has been deposited. The P3 pole 76 layer may consist of laminated layers of high magnetic moment ($B_s$) and non-magnetic laminated pole material such as CoFe or CoFeN or NiFe and Cr, $Al_2O_3$, Ru, Rh, etc., respectively which have been deposited on top of the alumina insulation layer 74 and shaping layer 44. On top of this, a thin non-magnetic film layer 78 layer of Ta/Rh, $Al_2O_3$ or C is deposited which may act as a cap layer.

Figure 12:
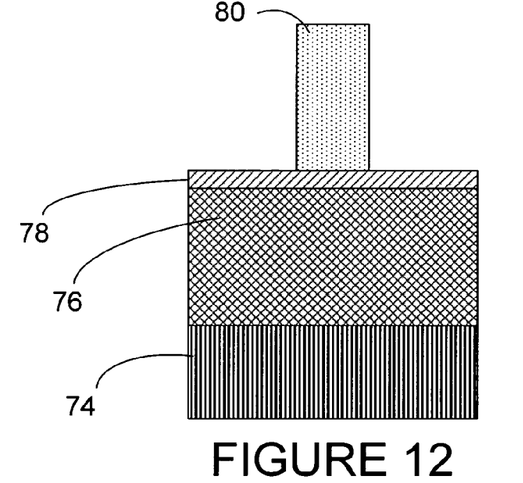

Next a milling mask layer 80 of durimide, alumina, NiFe, photo-resist or other material is fabricated, as shown in FIG. 12.

Figure 13:
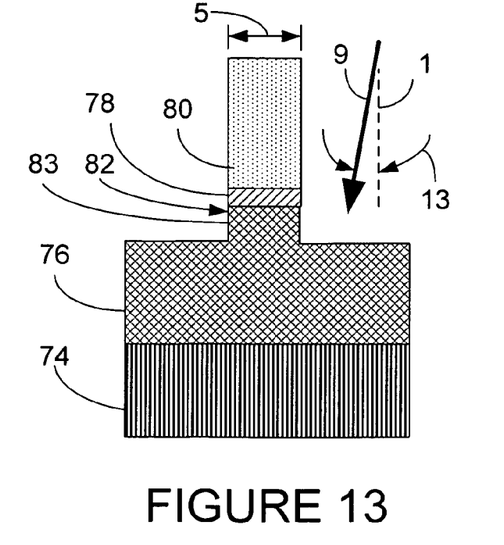

In FIG. 13, ion milling is used to establish the final track width 5, as indicted by the ion milling beam direction arrow 9. This milling operation is done at a combination of angle from a range of angles, preferably in the range of 0-75 degrees from normal incidence as indicated by the arrow 1, and will be referred to as the ion milling angle 13. The milling mask layer 80 protects a portion of the P3 pole tip 76 and cap layer 78. The ion milling also removes material from the unmasked portion of the P3 layer 76 forming a protrusion 82 which will become the rectangular portion of the final hexagonal P3 pole tip, as discussed below.

Figure 14:
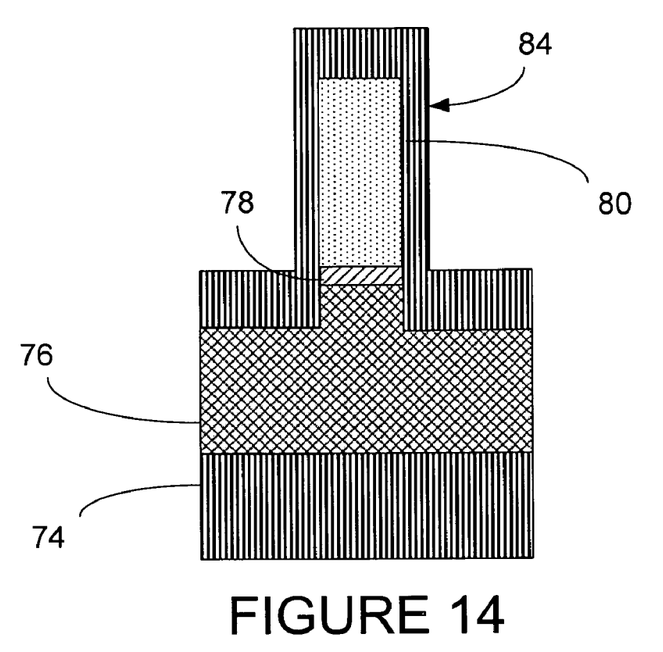

In FIG. 14, a thin layer of alumina 84 is deposited over the entire structure as it exists at this stage, including the P3 material 76, cap layer 78 and mask layer 80.

Figure 15:
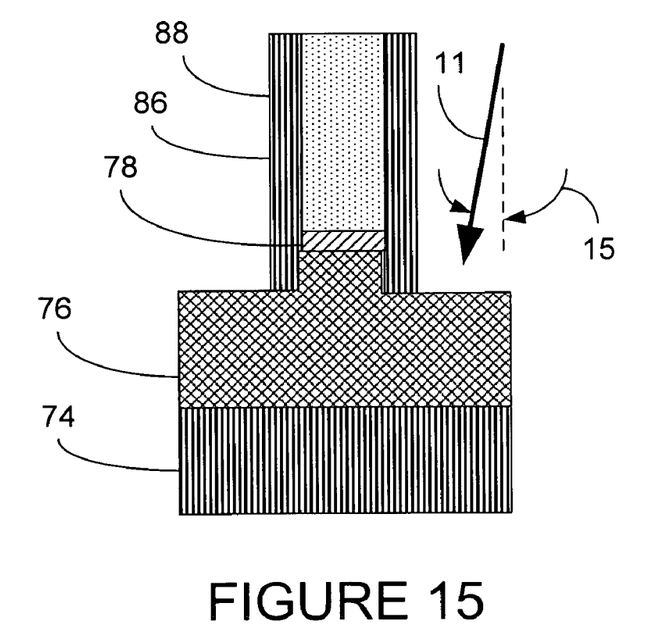

Next, reactive ion milling is used as indicated by the arrow 11 to remove the alumina layer from the top of the mask 80 and P3 layers 76. RI milling is used because, the alumina has a fast milling rate, compared to the mask and P3 layers, leaving wall portions of alumina 86 that act as temporary wall masks 88, as shown in FIG. 15. This reactive ion milling operation is also done at a combination of angles from a range of angles, preferably in the range of 0-75 degrees from normal incidence as indicated by the arrow 1, and will be referred to as the reactive ion milling angle 15.

Figure 16:
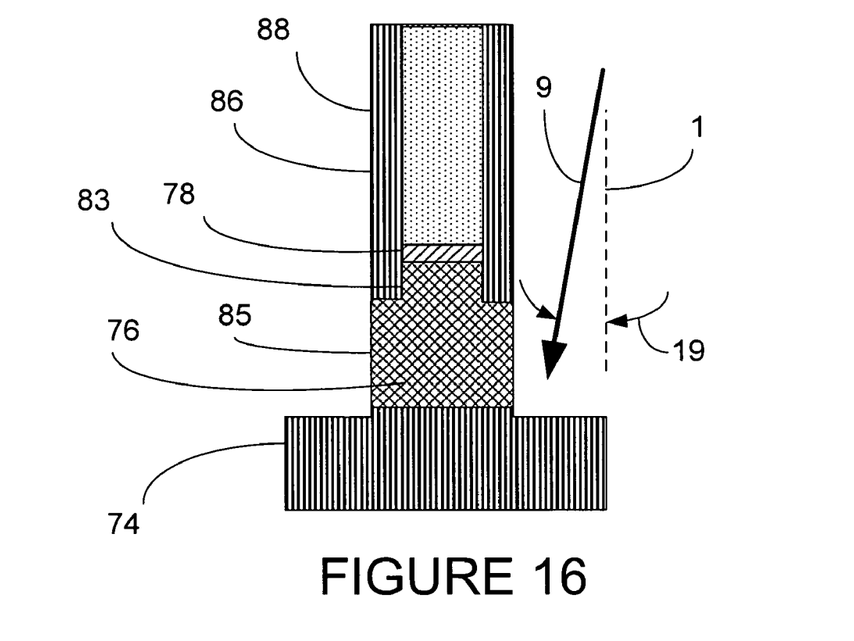

FIG. 16 shows the next stage in which ion milling is again used at a combination of angles preferably in the range of 0-75 degrees from normal incidence 1, as indicated by the arrow 9 and will be referred to as the second ion milling angle 19. This is done to cut the P3 layer 76 away down to and slightly into the alumina insulation layer 74. As alumina has a slower milling rate under ion milling compared to the P3 layer material, it acts as a temporary wall mask 88 to preserve the P3 material directly under it, producing the structure shown in the figure. Thus alumina wall portions 86 act as temporary wall masks 88 to shield protected wall portions 83 including the cap layer 78, leaving the unprotected wall portions 85 to be shaped by the ion milling beam.

Figure 17:
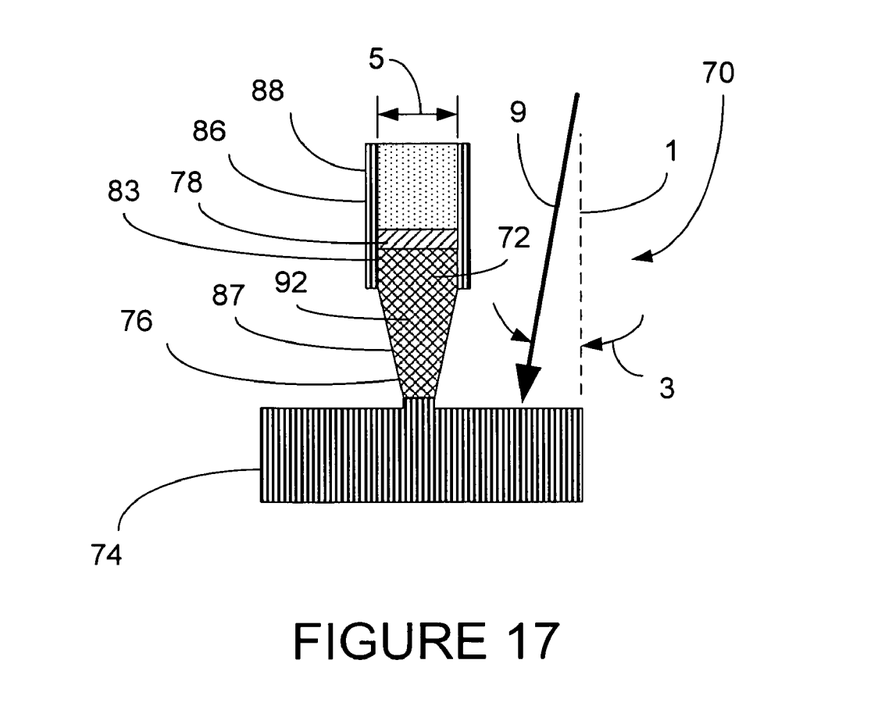

Next ion milling is done at a glancing angle to produce a beveling angle 3, which is preferably in the range of 6-15 degrees from normal to the material 1, as shown by the arrow 9 in FIG. 17. As before, the alumina wall material 86 mills more slowly than the material of the P3 layer 76, so that the alumina wall portions 86 again act as a temporary wall mask 88. The protected wall portions 83 thus produce the rectangular portion 72 of the hexagonal P3 pole tip 70, while the wall sides are beveled to the appropriate angle to make beveled wall portions 87 of a beveled portion 92 of the hexagonal P3 pole tip 70. Thus the hexagonal P3 pole tip 70 is produced with the track width 5 preserved in the rectangular portion 72.

Figure 18:
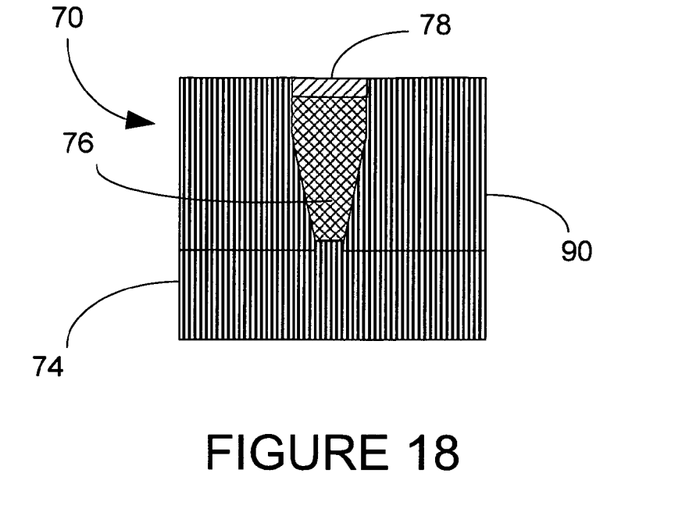

In FIG. 18, Chemical Mechanical Polishing (CMP) is performed to remove the mask 80 and the wall mask alumina portions 86 (see FIG. 17) which surround the mask. The cap layer 78 acts as a stop layer for the CMP. Alumina fill 90 is then deposited to encapsulate the P3 pole tip 76 and complete the fabrication.

FIG. 19 shows a detail view of the hexagonal P3 pole tip 70. A dashed line is used to separate the protected portion 83, which becomes the rectangular portion 72 from the unprotected portion 85 which becomes the beveled portion 92 having walls 64 which are beveled walls 87. The remaining cap layer 78 is also shown. No attempt has been made to make the relative proportions of the portions exactly to scale, and it is to be understood that there is much variation possible in the relative sizes of areas, as well as in the bevel angle 3 and the track width 5. As discussed above, the method of the present invention allows great and independent control of these crucial variables of bevel angle 3 and the track width 5 to produce a configuration not found in the prior art.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method for independently controlling track width and bevel angle of a P3 write pole tip for perpendicular recording, comprising:
   A) establishing the track width in a portion of P3 write pole material including:
      i) depositing an insulation layer;
      ii) depositing a P3 layer on said insulation layer;
      iii) depositing a cap layer on said P3 layer;
      iv) fabricating a mask layer on said cap layer; and
      v) shaping said P3 layer and said cap layer to form a protrusion having protrusion wall portions from said P3 layer;
   B) protecting said portion of said P3 write pole material having said track width thus preserving said track width by providing a temporary masking material to make a protected portion of said P3 write pole material, leaving at least one unprotected portion of said P3 write pole material to be shaped; and
   C) beveling said at least one unprotected portion of said P3 write pole material to produce at least one beveled portion of said P3 write pole material having a bevel angle.

2. The method of claim 1, wherein:
   B) includes:
      i) depositing an alumina layer on said P3 layer including said protrusion wall portions; and
      ii) shaping said alumina layer to produce alumina wall portions on said protrusion wall portions to produce protected portions of said P3 layer and unprotected portions of said P3 layer.

3. The method of claim 2, wherein:
   C) includes:
      i) shaping said unprotected portions of said P3 layer material, while protecting said protected portions of said P3 layer to form a rectangular portion and a beveled portion.

4. The method of claim 1, further comprising:
   D) encapsulating said P3 write pole material in insulating material.

* * * * *